UNITED STATES PATENT OFFICE.

ERNST WALDEMAR JUNGNER, OF STOCKHOLM, SWEDEN.

PROCESS OF MAKING ACTIVE MATERIAL FOR ACCUMULATOR-PLATES.

SPECIFICATION forming part of Letters Patent No. 670,024, dated March 19, 1901.

Application filed May 12, 1900. Serial No. 16,459. (No specimens.)

*To all whom it may concern:*

Be it known that I, ERNST WALDEMAR JUNGNER, Cand. Phil., a subject of the King of Sweden and Norway, residing at Brahsgatan No. 7, Stockholm, Sweden, have invented certain new and useful Improvements in Negative Electrodes for Accumulators with Invariable Electrolytes; and I do hereby declare the following to be a full, clear, and exact description of the invention, such as will enable others skilled in the art to which it appertains to make and use the same.

The present invention relates to the manufacture of negative electrodes designed to be used in the accumulator shown and described in my application for patent, Serial No. 713,428.

It is well known that the oxids of zinc and magnesium form with the chlorids of these metals basic insoluble compounds. This is also the case with cadmium oxid, and the present invention deals with this property of cadmium oxid and its use to form negative electrode material.

If cadmium oxid is stirred up with a solution of cadmium chlorid to a thick dough, the mixture will stiffen and set to a hard mass, consisting of oxychlorids of variable composition, as $Cd_4O_3Cl_2$, and this action is not confined to the mixture of cadmium oxid and chlorid alone, but is also the case with salts containing acid radicals other than chlorin and which combine with the oxid to form basic compounds; nor is the invention restricted to pure cadmium compounds, but embraces those basic combinations formed with cadmium oxid and salts of other metals by double decomposition—as, for instance, with cupric chlorid, $(CuCl_2+CdO=CuO.+CdCl_2.)$ If cadmium oxid is present in excess, it combines with cadmium chlorid to form a solid mass, and the solidity of this mass formed of the double salt is the greater the more slowly the combination takes place, and it is therefore important to select a method of manufacture which causes the double salt or oxychlorid to be slowly formed, and such means is by the use of ammonium chlorid, which reacts by double decomposition, as follows:

$$2NH_4Cl+CdO=2NH_3+H_2O+CdCl_2,$$

$$CdCl_2+3CdO=CdCl_2 3CdO \text{ or } Cd_4O_3Cl_2,$$

and the method of procedure will be as follows: A suitable grid, as a net or perforated plate of metal which is chemically indifferent to the electrolyte to be used, such as copper, is coated with cadmium oxid that has been stirred up with water containing a small quantity of ammonium chlorid, and as soon as dry the electrode is placed in a solution of ammonium chlorid for from two to fifty hours, whereby a solid mass is formed, as indicated by the above reactions. The electrodes are then placed in an alkaline bath to reduce the metal to a metallic state by removing the oxygen and chlorin from the basic salt, as follows:

$$Cd_4O_3Cl_2+8KOH=$$
$$4Cd+H_2O+2KCl+6KOH+2.O_2,$$

$$4CdO+2KOH=4Cd+2KOH+2.O_2,$$

and in this manner the cadmium is deposited on the grid in a chemically-divided state that partly retains the solidity of the basic-salt mass. The electrode is then ready for use in an accumulator, which, in connection with a silver-oxid negative electrode, will discharge as follows:

$$Ag_2O+2Cd=2Ag+Cd_2O,$$

and will charge as follows:

$$2Ag+Cd_2O=Ag_2O+2Cd.$$

By mixing the cadmium-oxid mass with iron, manganese, or copper, or chemical combinations of these metals, the cost of manufacture will be considerably reduced, when the battery will discharge with the accompanying reactions:

$$Ag_2O+2FeO=2Ag+Fe_2O_3.$$

$$Ag_2O+2MnO=2Ag+Mn_2O_3.$$

$$Ag_2O+2Cu=2Ag+Cu_2O.$$

Cadmium oxid mixed with ammonium chlorid is placed on a grid, and when dry the grid is immersed in a solution of that salt of the metal which will react with cadmium oxid to form a basic salt.

Having thus described my invention, what I claim as new therein, and desire to secure by Letters Patent, is—

1. The method of making active material for accumulator-plates, which consists in forming a double salt of cadmium, and extracting therefrom the negative radicals by suitable means, substantially as set forth.

2. The method of making active material for accumulator-plates, which consists in forming a basic double salt of cadmium and another metal, and extracting therefrom the negative radicals, substantially as described.

3. The method of making active material for accumulator-plates, which consists in mixing oxid of cadmium with a suitable salt of a metal, treating the mixture with ammonium chlorid to cause the formation of a basic double salt, and removing the negative radicals from such double salt, substantially as set forth.

4. The method of making active material for accumulator-plates, which consists in mixing cadmium oxid with a small quantity of ammonium chlorid, drying, immersing in a solution of a metallic salt capable of combining with the cadmium oxid to form a basic salt, and electrolytically reducing the double salt so formed, substantially as described.

5. The process of producing active material for accumulator-plates, which consists in mixing cadmium oxid with the salt of a metal capable of forming therewith a basic double salt, causing the formation of the double salt by double decomposition with a solution of ammonium chlorid, and electrolytically reducing said double salt in an alkali-bath, substantially as described.

In testimony that I claim the foregoing as my invention I have signed my name in presence of two subscribing witnesses.

ERNST WALDEMAR JUNGNER.

Witnesses:
TH. WAWRINSKY,
M. GENBERG.